(12) United States Patent
Rabinovich et al.

(10) Patent No.: US 11,314,276 B2
(45) Date of Patent: Apr. 26, 2022

(54) METHOD OF TIME DELIVERY IN A COMPUTING SYSTEM AND SYSTEM THEREOF

(71) Applicant: ADVA Optical Networking SE

(72) Inventors: Michael Rabinovich, Modiin (IL); Moshe Tofef, Netanya (IL); Igal Pinchasov, Ramat Gan (IL)

(73) Assignee: ADVA Optical Networking SE

( * ) Notice: Subject to any disclaimer, the term of this patent is extended or adjusted under 35 U.S.C. 154(b) by 309 days.

(21) Appl. No.: 16/595,322

(22) Filed: Oct. 7, 2019

(65) Prior Publication Data

US 2020/0220636 A1   Jul. 9, 2020

(30) Foreign Application Priority Data

Jan. 7, 2019 (EP) ..................... 19150556

(51) Int. Cl.
*G06F 1/04* (2006.01)
*G06F 9/54* (2006.01)
(Continued)

(52) U.S. Cl.
CPC .............. *G06F 1/04* (2013.01); *G06F 1/14* (2013.01); *G06F 9/466* (2013.01); *G06F 9/545* (2013.01);
(Continued)

(58) Field of Classification Search
CPC ..... G06F 1/04; G06F 1/14; G06F 9/52; G06F 9/466; G06F 9/545; G06F 15/17325; G06F 11/1675; H04J 3/0667
See application file for complete search history.

(56) References Cited

U.S. PATENT DOCUMENTS 5,805,870 A * 9/1998 Browning ................ G06F 1/14
713/375
6,023,769 A   2/2000 Gonzalez
(Continued)

FOREIGN PATENT DOCUMENTS

EP        3026861 A1 * 6/2016  ........... H04L 7/0008
WO    2015/023478 A2   2/2015
(Continued)

OTHER PUBLICATIONS

Definition "interface." The Linux Information Project. 2005. [retrieved on Oct. 5, 2021], Retrieved from the Internet: <URL: www.linfo.org/interface.html>. (Year: 2005).*
(Continued)

*Primary Examiner* — Joshua Kading
(74) *Attorney, Agent, or Firm* — Wiggin and Dana LLP; Pierre R. Yanney (57) ABSTRACT

There is provided a technique of time delivery in a computing system comprising a system call interface (SCI) located in a kernel space and operatively connected to a time client located in a user space. The technique comprises: using a time agent component located in the user space to measure data indicative of delay in a system time delivery and to derive therefrom a system time delivery error $TE_{S2C}$; using $TE_{S2C}$ to enable correction of system time; and sending by the SCI the corrected system time in response to a "Read Clock RT" (RCRT) call received from the time client. The method can further comprise: measuring data indicative of delays in the system time delivery for RCRT calls with different priorities; and in response to a system time request received from the time client, providing the time client with system time corrected per $TE_{S2C}$ corresponding to the recognized priority thereof.

20 Claims, 10 Drawing Sheets

(51) Int. Cl.
*H04J 3/06* (2006.01)
*G06F 15/173* (2006.01)
*G06F 1/14* (2006.01)
*G06F 9/46* (2006.01)
*G06F 11/16* (2006.01)

(52) U.S. Cl.
CPC .... *G06F 11/1675* (2013.01); *G06F 15/17325* (2013.01); *H04J 3/0667* (2013.01)

(56) References Cited

U.S. PATENT DOCUMENTS

| | | |
|---|---|---|
| 6,629,249 B2 | 9/2003 | Gonzalez |
| 2002/0129291 A1* | 9/2002 | Gonzalez .............. H04J 3/0697 713/400 |
| 2003/0221138 A1* | 11/2003 | Shirakawa ................ G06F 1/14 713/400 |
| 2007/0288785 A1* | 12/2007 | Saito .......................... G06F 1/14 713/400 |
| 2011/0022708 A1 | 1/2011 | Candia et al. |
| 2012/0087402 A1 | 5/2012 | Patoine |
| 2014/0003199 A1 | 1/2014 | Dougan et al. |
| 2017/0294979 A1 | 10/2017 | Hansson et al. |
| 2018/0152281 A1 | 5/2018 | Zigelboim et al. |

FOREIGN PATENT DOCUMENTS

| | | |
|---|---|---|
| WO | 2015/167745 A1 | 11/2015 |
| WO | 2017/114568 A1 | 7/2017 |
| WO | 2018/067817 A1 | 4/2018 |

OTHER PUBLICATIONS

Definition "kernel space." The Linux Information Project. 2005. [retrieved on Oct. 6, 2021], Retrieved from the Internet: <URL: www.linfo.org/kernel_space.html>. (Year: 2005).*

Definition "user space." The Linux Information Project. 2005. [retrieved on Oct. 5, 2021], Retrieved from the Internet: <URL: www.linfo.org/user_space.html>. (Year: 2005).*

* cited by examiner

METHOD OF TIME DELIVERY IN A COMPUTING SYSTEM AND SYSTEM THEREOF

CROSS-REFERENCE TO RELATED APPLICATIONS

The present application claims priority to European Patent Application No. 19150556.9 that was filed Jan. 7, 2019, the contents of which is hereby incorporated by reference in its entirety.

TECHNICAL FIELD

The presently disclosed subject matter relates to the field of computing systems and, more particularly, to delivering accurate time to computer-implemented applications.

BACKGROUND

Computer-implemented applications and, especially, real-time applications, require accurate and precise time for a proper operation. Increasing time accuracy and precision by frequency and/or phase synchronization is known in the conventional art and various techniques have been developed to provide solutions. Among the solutions are time transfer protocols as, for example, IEEE 1588 Precision Time Protocol (PTP) and Network Time Protocol (NTP).

Typically, compared to a precise time source (e.g. UTC time), the time error ($T_{ERR}$) of the time delivered to an application is composed of the following time errors:

$$T_{ERR} = TE_{TP} + TE_{TP2S} + TE_{S2C}, \text{ where:}$$

$TE_{TP}$ is the time error due to the time transfer by a time transfer protocol;

$TE_{TP2S}$ is the time error due to locking system time to time transfer protocol (applicable in case of the HW timestamping); and $TE_{S2C}$ is the time error of reading system time by the application.

The inventors recognized that known techniques, while enabling successful time recovery, do not address the problem of improving accuracy of delivering the recovered time to respective applications.

GENERAL DESCRIPTION

In accordance with certain aspects of the presently disclosed subject matter, there is provided a method of time delivery in a computing system comprising a system call interface (SCI) located in a kernel space and operatively connected to a time client located in a user space. The method comprises: a) using a time agent component located in the user space to measure data indicative of delay in a system time delivery and to derive therefrom a system time delivery error $TE_{S2C}$; b) using the system time delivery error $TE_{S2C}$ to enable correction of system time thereby giving rise to a corrected system time; c) sending by the SCI the corrected system time in response to a "Read Clock RT" call received from the time client.

Operations a)-c) can be repeated periodically and/or initiated responsive to one or more predefined events.

In accordance with further aspect of the presently disclosed subject matter, measuring data indicative of delay in the system time delivery and deriving therefrom the system time delivery error $TE_{S2C}$ can comprise: d) issuing by the time agent component N≥2 successive "Read clock RT" calls configured with the highest priority, wherein each next call is issued substantially immediately following response received on the previous call; e) registering by a time agent component system time $t1_{RT}$ received in response to a first call and a time $tN_{RT}$ received in response to a last call; and f) calculating $TE_{S2C}$ as $TE_{S2C} = (tN_{RT} - t1_{RT})/[(N-1)*2]$.

In accordance with further aspect of the presently disclosed subject matter, enabling correction of system time can comprise: calculating by the time agent component a corrected system time in accordance with the system time delivery error $TE_{S2C}$; and sending the corrected system time to the SCI as a value in a time setting command.

In accordance with further aspect of the presently disclosed subject matter, the method can further comprise: using the time agent component to measure data indicative of delays in the system time delivery for "Read Clock RT" calls with different priorities of a plurality of priorities, and to respectively obtain a set of data indicative of priority-based system time delivery errors TES2C corresponding to respective priorities of the plurality of priorities; in response to a system time request received from the time client, recognizing priority thereof and providing the time client with system time corrected per system time delivery error corresponding to the recognized priority.

Obtaining the set of system time delivery errors $TE_{S2C}$ can comprise providing operations d)-f) separately for each priority of the plurality of priorities.

The set of data indicative of priority-based system time delivery errors can comprise at least one of: for each priority of the plurality of priorities, the last calculated $TE_{S2C}$; differences between the last calculated $TE_{S2C}$ for the highest priority and the last calculated $TE_{S2C}$ for each of the lower priorities; for each priority of the plurality of priorities, differences between the last calculated $TE_{S2C}$ and the previously calculated $TE_{S2C}$; for each priority of the plurality of priorities, system time $t_{rt}$ lastly corrected in accordance with $TE_{S2C}$ corresponding to respective priority.

The set of data indicative of priority-based system time delivery errors can be maintained by the time agent component in a data structure located in the kernel space and accessible to the SCI. SCI, in response to the system time request, can obtain from the data structure the data indicative of system delivery error corresponding to the recognized priority, and calculate the corrected system time accordingly.

In accordance with further aspect of the presently disclosed subject matter, the corrected system time can be provided in accordance with policy marking recognizable by SCI.

In accordance with further aspect of the presently disclosed subject matter, the method can further comprise: g) upon disabling CPU interrupts, running a test application performing a loop of a fixed length and determining a loop time TL; h) comparing the obtained value of loop time with one or more values of loop time determined in one or more previous runs of the test application; and i) using the determined discrepancy between the values to steer relative frequencies of time sources in a central processing unit and a network interface card comprised in the computing system.

In accordance with further aspect of the presently disclosed subject matter, operations a)-c) and/or g)-i) can be provided responsive to results of validation. The validation can comprise: exchanging, by the time agent component, PTP sync messages with an external probe device with a precise reference; and registering respective PTP timestamps thereby obtaining measurement results indicative of time errors, wherein static time errors are indicative of system time delivery errors and dynamic time errors are indicative of discrepancy of frequency shift.

The method can comprise one or more of aspects listed above, in any desired combination or permutation which is technically possible.

In accordance with other aspect of the presently disclosed subject matter, there is provided a computing system configured to operate in accordance with any technically possible combination or permutation of the above aspects of the method of time delivery.

In accordance with other aspect of the presently disclosed subject matter, there is provided a computer program product implemented on a non-transitory computer usable medium and comprising computer readable program code for performing any technically possible combination or permutation of the above aspects of the method of time delivery.

Among advantages of certain embodiments of presently disclosed subject matter is capability of improving accuracy of delivering the system time to respective time clients.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "sending", "receiving", "calculating", "generating", "correcting", "obtaining", "enabling", or the like, refer to the action(s) and/or process(es) of a computer that manipulate and/or transform data into other data, said data represented as physical, such as electronic, quantities and/or said data representing the physical objects.

The term "computer" should be expansively construed to cover any kind of hardware-based electronic device with data processing capabilities including, by way of non-limiting example, the computing system disclosed in the present application.

The operations in accordance with the teachings herein can be performed by a computer specially constructed for the desired purposes or by a general-purpose computer specially configured for the desired purpose by a computer program stored in a computer readable storage medium.

The terms "non-transitory memory" and "non-transitory storage medium" used herein should be expansively construed to cover any volatile or non-volatile computer memory suitable to the presently disclosed subject matter.

The term "clock" should be expansively construed to cover any kind of circuitry comprising any appropriate combination of software, firmware and/or hardware and capable to produce a time or frequency signal (e.g. an electrical signal, a value in a register, a value in a network packet, etc.). It is to be understood that the term "signal" used herein excludes transitory propagating signals, but includes any other signal suitable to the presently disclosed subject matter.

Embodiments of the presently disclosed subject matter are not described with reference to any particular programming language. It will be appreciated that a variety of programming languages can be used to implement the teachings of the presently disclosed subject matter as described herein.

Figure 1:
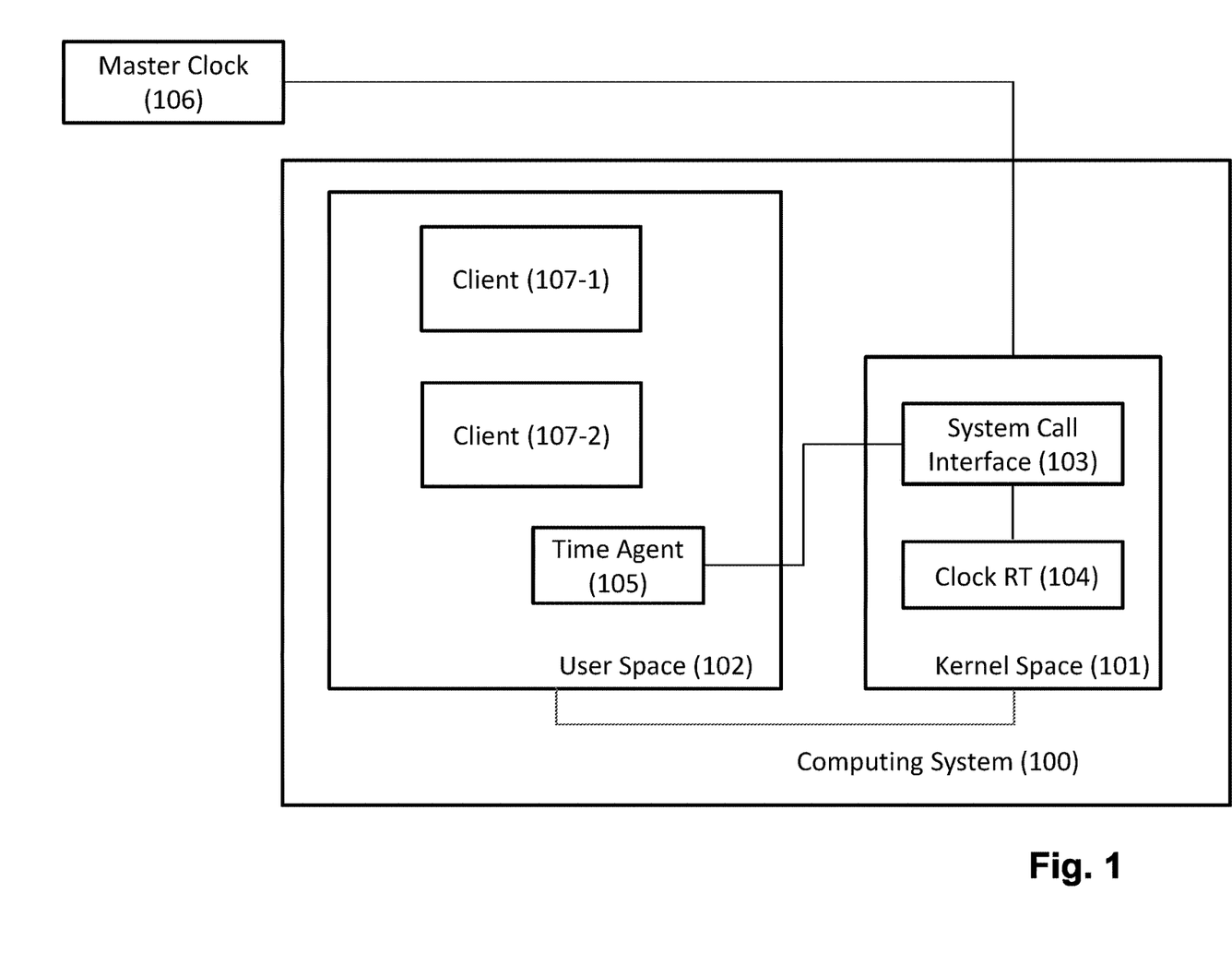
FIG. 1 illustrates a generalized functional block diagram of a computing system in accordance with certain embodiments of the presently disclosed subject matter.

Bearing this in mind, attention is drawn to FIG. 1 schematically illustrating a functional block diagram of a computing system configured in accordance with certain embodiments of the presently disclosed subject matter.

Computing system 100 comprises a kernel space 101 configured to execute privileged OS functions and operatively connected user space 102 configured to execute one or more user programs. User space programs are restricted from direct access to the computing system's resources, and access is handled by the operating system on behalf of the user's programs. The user space programs typically communicate with the OS through system calls.

Operating system is configured to run on a central processing circuitry (CPU), not illustrated separately. CPU further comprises a real-time clock 104 (referred to hereinafter as Clock RT) configured to serve as a time source for one or more time clients 107 (denoted as 107-1-107-3) executable by the computing system. Typically, Clock RT driver is a part of kernel 101.

Unless specifically stated otherwise, throughout the specification the term "time client" (TC) should be expansively construed to cover any kind of user program running on the computing system 100 and configured to obtain time from OS with the help of system command(s). Time values provided by the OS are referred to hereinafter also as system time. OS is configured to receive system time requests from TCs, responsively derive system time from Clock RT 104 and provide the respective values to the time clients via System Call Interface 103.

It is noted that the time clients can also run in a virtual environment emulated in the computing system and, optionally (e.g. when running on a virtual machine), can obtain system time via virtual OS emulated in the computing system.

For purpose of illustration only, the following description is provided for Linux OS. Those skilled in the art will readily appreciate that the teachings of the presently disclosed subject matter are, likewise, applicable to Windows OS or any other operational system supporting a real-time clock capable of serving as a clock source for the time clients.

Clock RT 104 can be implemented in different ways known in the art. By way of non-limiting example, Clock RT 104 can comprise a Time Stamp Counter (TSC). The TSC is a register counter typically running at the frequency of the CPU and driven by the same oscillator that is used to generate the clock pulses that drive the CPU. TSC starts running when the computing system boots. It is noted that in a multi-core CPU, each core can have its own counter being a part of the clock RT. TSC can keep all counters synchronized across all cores in the computing system. Further, TSC can be configured to keep the counters running at a fixed rate regardless of changes in CPU frequency.

Optionally, Clock RT 104 can be further operatively connected to a Master Clock 106 that can provide Clock RT with external accurate time with the help of PTP, NTP or other suitable timing protocol. The synchronization process can be provided, for example, with the help of Linux PTP daemon.

System Call Interface (SCI) 103 is configured to derive system time from Clock RT 104. SCI is further configured to provide system time to the TCs in response to clock_gettime(CLOCK_REALTIME) call or any other appropriate command received from a time client. A command triggering SCI 103 to derive system time from Clock RT 104 and further deliver the obtained value to the time client is referred to hereinafter as "Read Clock RT" call.

In accordance with certain embodiments of the presently disclosed subject matter, user space is configured to comprise a time agent component 105. Time agent component 105 (e.g. a user program) is configured to communicate with OS so as to enable corrections of system time (e.g. with root privilege) as further detailed with reference to FIGS. 2-9.

Those versed in the art will readily appreciate that the teachings of the presently disclosed subject matter are not bound by the computing system illustrated in FIG. 1; equivalent and/or modified functionality can be consolidated or divided in another manner and can be implemented in any appropriate combination of software with firmware and/or hardware. The time agent component can be implemented in any appropriate combination of software, firmware and/or hardware as one or more time clients operating in conjunction with OS.

Figure 2:
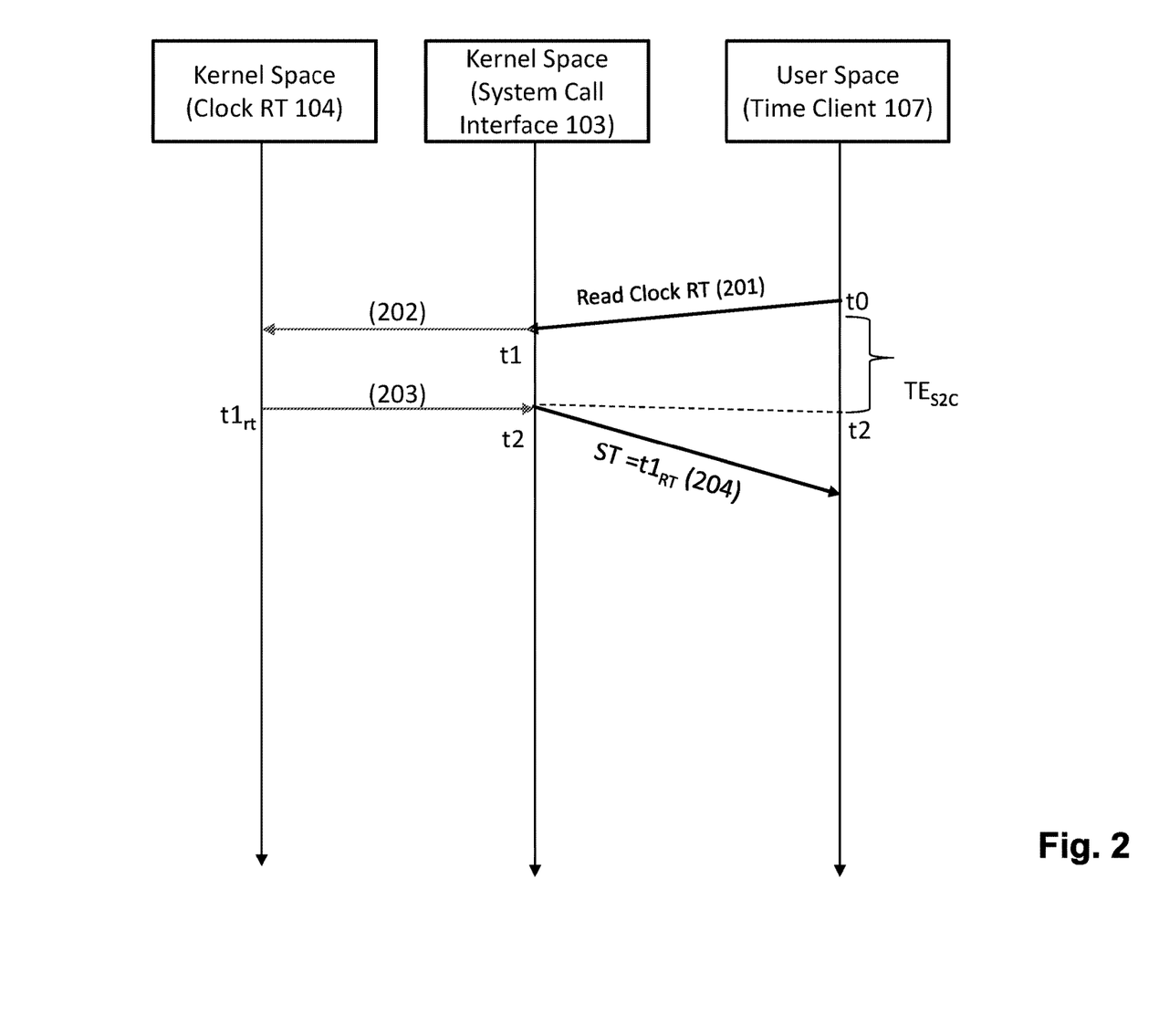
FIG. 2 illustrates a generalized pictorial representation of an error ($TE_{S2C}$) in system time delivered to a time client in response to a "Read Clock RT" call.

Referring to FIG. 2, there is illustrated a pictorial representation of a time error $TE_{S2C}$ in reading system time by a time client (TC) 107 (referred to hereinafter also as system time delivery error). At point-in-time t0, time client 107 sends (201) to SCI 103 a "Read clock RT" call. SCI receives the call at point-in-time t1, sends (202) the respective request to Clock RT 104 and obtains (203) system time $t1_{rt}$ provided by Clock RT at point-in-time t2 substantially equal to $t1_{rt}$. SCI further sends (204) the system time $t1_{rt}$ to time client 107 which, respectively, receives system time $t1_{rt}$ at point-in-time t3. The difference (t0–t2) between time of issuing "Read Clock RT" call by a given TC and system time $t1_{rt}$ provided in the response is referred to hereinafter as a system time delivery error $TE_{S2C}$. $TE_{S2C}$ can vary depending on CPU load, call priority, etc.

Figure 3:
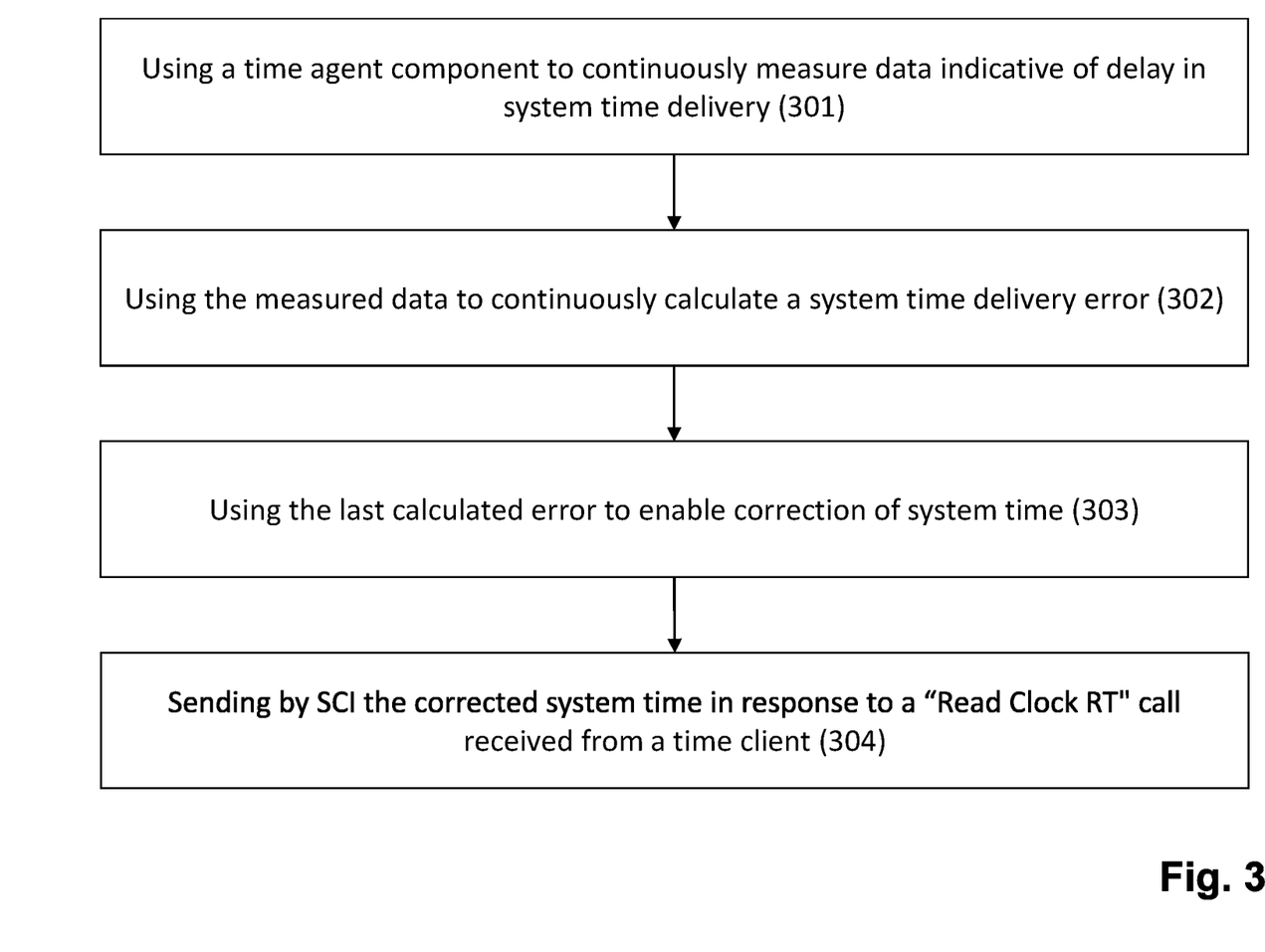
FIG. 3 illustrates a generalized flow chart of compensating the system time error $TE_{S2C}$ in accordance with certain embodiments of the presently disclosed subject matter.

FIG. 3 illustrates a generalized flow chart of compensating the $TE_{S2C}$. In accordance with certain embodiments of the presently disclosed subject matter, time agent component continuously measures (301) data indicative of delay in time delivery and calculates (302) time error $TE_{S2C}$.

Unless specifically stated otherwise, it is appreciated that throughout the specification the terms "continuously measure", "continuously calculate" or the like refer to actions provided responsive to predefined events (including scheduled events and/or events occurring in accordance with predefined periodicity). Thus, measurements can be initiated periodically, responsive to results of validation detailed with reference to FIG. 10, etc.

Figure 4:
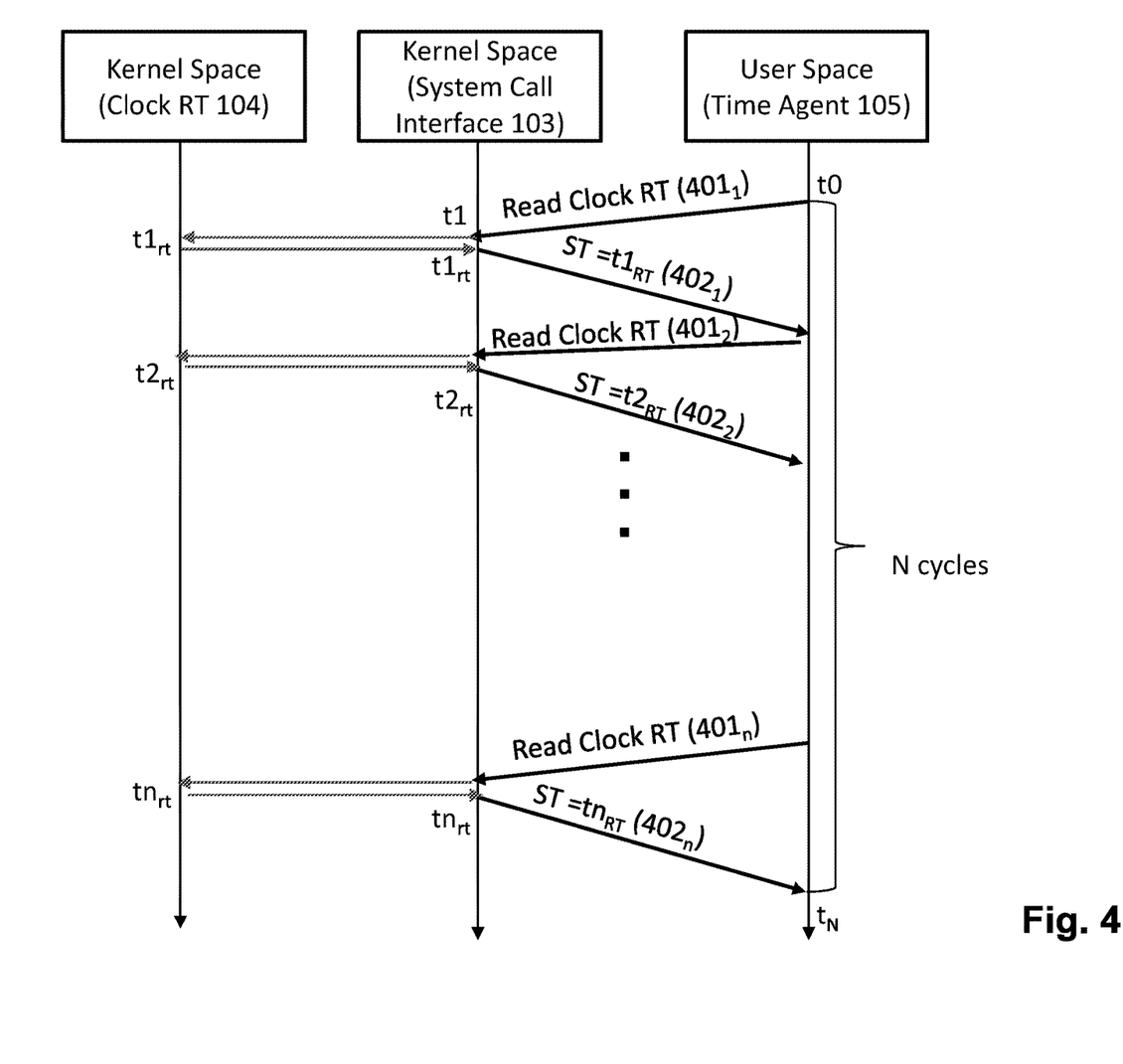
FIG. 4 illustrates a generalized pictorial representation of measuring delay in time delivery in accordance with certain embodiments of the presently disclosed subject matter.

FIG. 4 illustrates a non-limiting example of measuring delay usable for $TE_{S2C}$ calculation. As illustrated, time agent component 105 can issue N≥2 successive "Read clock RT" calls (401$_i$), wherein each next call 401$_{i+1}$ is issued substantially immediately following response 402$_i$ received on the previous call (i=1, . . . n). The calls are configured with the highest priority (e.g. as real-time calls) so that the delay (t1–t1$_{RT}$) between time t1 of receiving the call by SCI and system time t1$_{RT}$ respectively obtained by SCI can be considered as negligible compared with the total $TE_{S2C}$ error. Time agent component 105 registers system time t1$_{RT}$ received in response to the first call and time $t_{N\;RT}$ received in response to the last call. Assuming symmetric propagation, $TE_{S2C}$ can be calculated as one way average delay, namely: $TE_{S2C}=(tn_{RT}-t1_{RT})/[(N-1)*2]$.

By way of non-limiting example, the number of cycles N can be configured between one-digit and two-digits so to enable statistical accuracy whilst keeping negligible impact on SCI and Clock RT load. For example, the duration of measurement can be configured in a range of few milliseconds, and the measurements (and respective $TE_{S2C}$ calculation) can be configured to be provided every 100 seconds.

Referring back to FIG. 3, time agent component 105 calculates data indicative of the last calculated $TE_{S2C}$ to calculate the corrected system time. Further, being configured with root privilege, time agent component 105 sends the corrected system time to the SCI as a value in a time setting command (e.g. clock_settime command) to provide SCI with corrected system time, and, thus, to enable (303) system time correction. SCI sends (304) the corrected system time in response to a read clock RT call received from a given TC.

Optionally, correcting the system time after each next measurement cycle can be provided using the difference between the last calculated $TE_{S2C}$ and the previously calculated $TE_{S2C}$.

Optionally, a currently calculated $TE_{S2C}$ can be applied for correcting system time to be delivered to any TC that issues a "Read Clock RT" call between calculating the currently calculated $TE_{S2C}$ and the next $TE_{S2C}$.

However, in certain embodiments, different time clients can have different priorities for processing, including priority for reading the system time. Consequently, although correcting system time, as detailed above, can improve accuracy of system time delivery to low priority TCs, nevertheless, it will not compensate the respective entire error in system time delivery thereto. In accordance with certain embodiments of the presently disclosed subject matter, compensating the error in system time delivered to a given TC can be provided in accordance with its priority.

Figure 5:
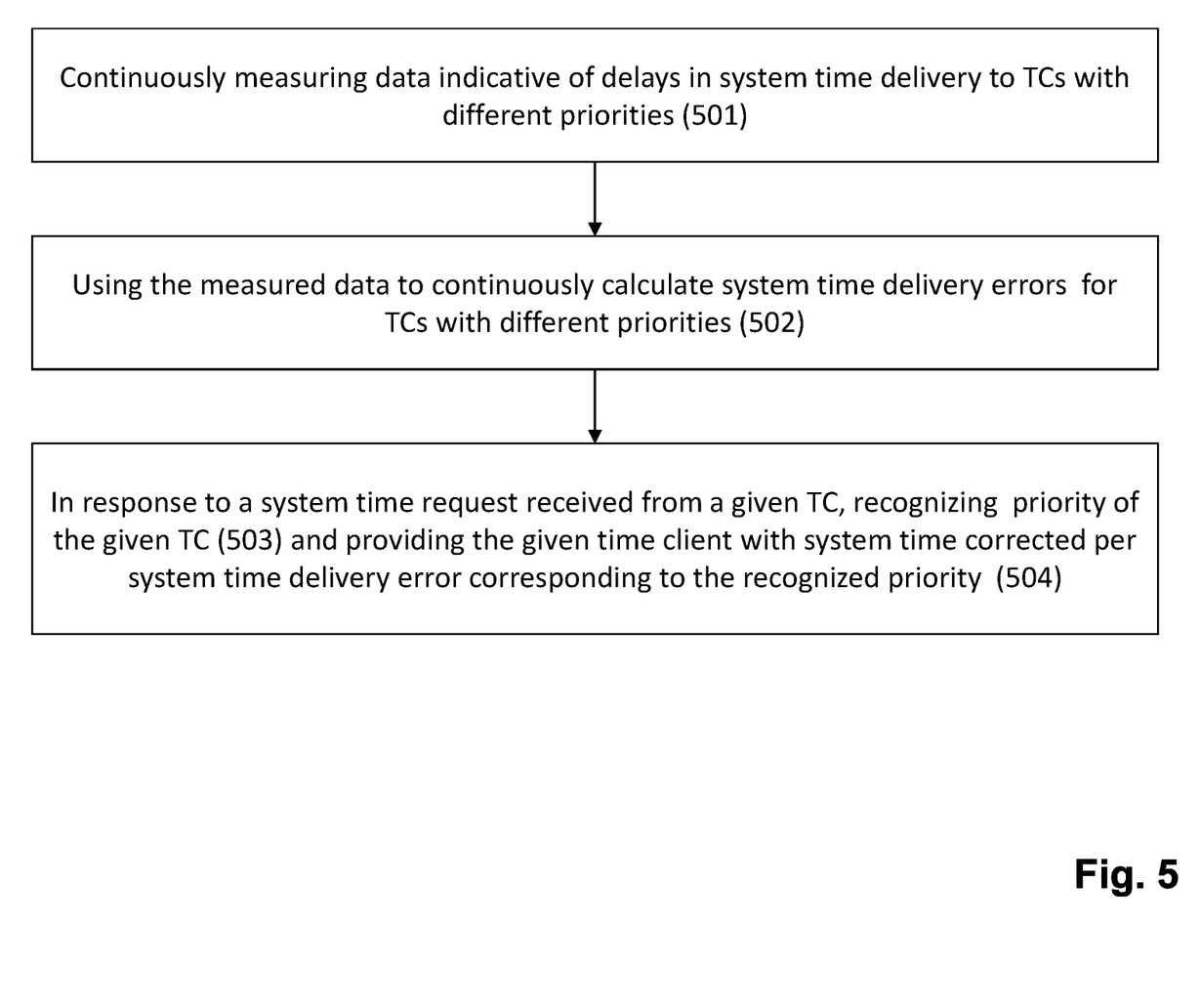
FIG. 5 illustrates a generalized flow chart of priority-based compensating the system time error $TE_{S2C}$ in accordance with certain embodiments of the presently disclosed subject matter.

Referring to FIG. 5, there is illustrated a generalized flow chart of priority-based compensating the error in system time delivered to a time client. In accordance with certain embodiments of the presently disclosed subject matter, the time agent component can be configured to continuously measure (501) data indicative of delays in system time delivered to TCs with different priorities, and to use (502) the measured data to continuously calculate system time delivery errors for TCs with different priorities.

Figure 6:
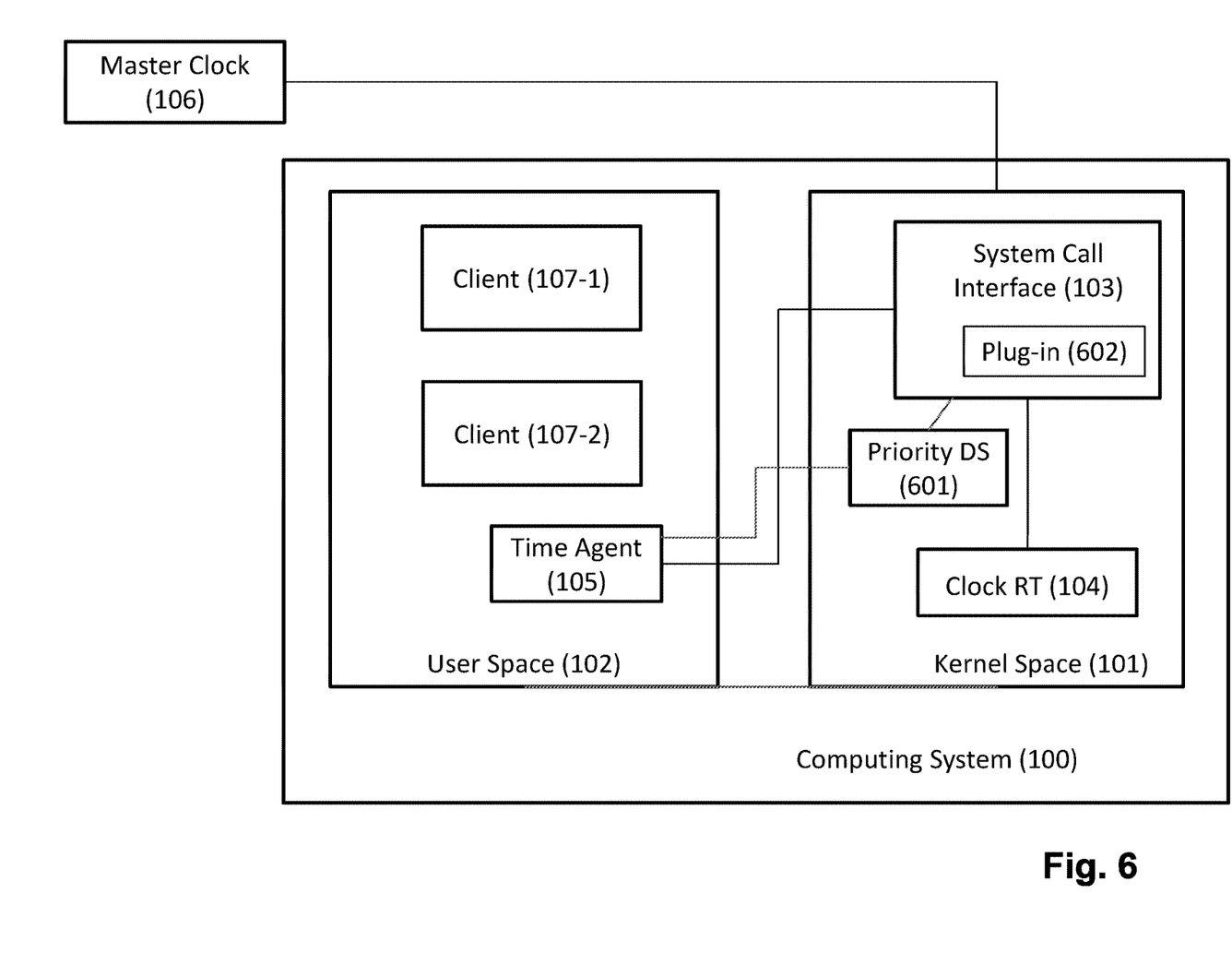
FIG. 6 illustrates a generalized functional block diagram of the computing system of FIG. 1 further configured to enable priority-based compensating the system time error $TE_{S2C}$ in accordance with certain embodiments of the presently disclosed subject matter.

FIG. 6 illustrates a generalized functional block diagram of the computing system of FIG. 1 further configured to enable priority-based compensating the system time delivery error. In accordance with certain embodiments of the presently disclosed subject matter, time agent component 105 can be further configured to issue "Read Clock RT" calls with different priorities and, thus, to provide operations 301-302 separately for each of the relevant priorities, thereby obtaining data indicative of $TE_{S2C}$ per each priority. Data indicative of $TE_{S2C}$ can be at least one of: the last calculated $TE_{S2C}$ for each of priorities; differences between the last calculated $TE_{S2C}$ for the highest priority and the last calculated $TE_{S2C}$ for each of the lower priorities; differences between the last calculated $TE_{S2C}$ and the previously calculated $TE_{S2C}$ for each of the priorities, the lastly corrected, for each of the priorities system time $t_{rt}$, etc. Such data can be maintained by time agent component 105 in a priority data structure (PDS) 601 (e.g. a look-up table organized in accordance with priorities) located in kernel space 101 and operatively connected to SCI 103.

SCI 103 can be configured to recognize a priority corresponding to a received "Read Clock RT" call. SCI can be further configured to comprise a plug-in component 602 configured to obtain, responsive to the "Read Clock RT" call, data from PDS 601 and to set for SCI system time corrected in accordance with call priority recognized by SCI 103 and with respectively obtained data. The corrected time can be calculated (at least for lower-priority time clients) by plug-in component 602 in accordance with priority-based $TE_{S2C}$ errors provided by time agent component 105 and stored in PDS 601.

Referring back to FIG. 5, in response to a "Read Clock RT" call received from a given TC, SCI recognizes (503) priority of the given TC and uses, with the help of plug-in component 602, the data in PDS 601 to provide (504) the given TC with system time corrected per system time delivery error corresponding to the recognized priority.

In certain embodiments of the invention, time agent component 105 can be configured to store in PDC 601 priority-based data indicative of $TE_{S2C}$ for all priorities of a plurality of relevant (e.g. predefined) priorities, and plug-in component 602 can be configured to provide, respectively, corrected system time to SCI for all "Read Clock RT" calls corresponding to the priority of the plurality relevant priorities. It is noted that for "Read Clock RT" calls (if any) with priorities other than of the plurality of relevant priorities, SCI 103 provides system time as received from the Clock RT.

Alternatively, for the highest priority time clients, time agent component 105 and SCI 103 can operate in a manner detailed with reference to FIG. 3, and plug-in-based time correction can be provided only for the lower-priority calls. It is noted that also for "Read Clock RT" calls (if any) with priorities other than of the plurality of relevant priorities, time agent component 105 and SCI 103 can operate in a manner detailed with reference to FIG. 3.

Figure 7:
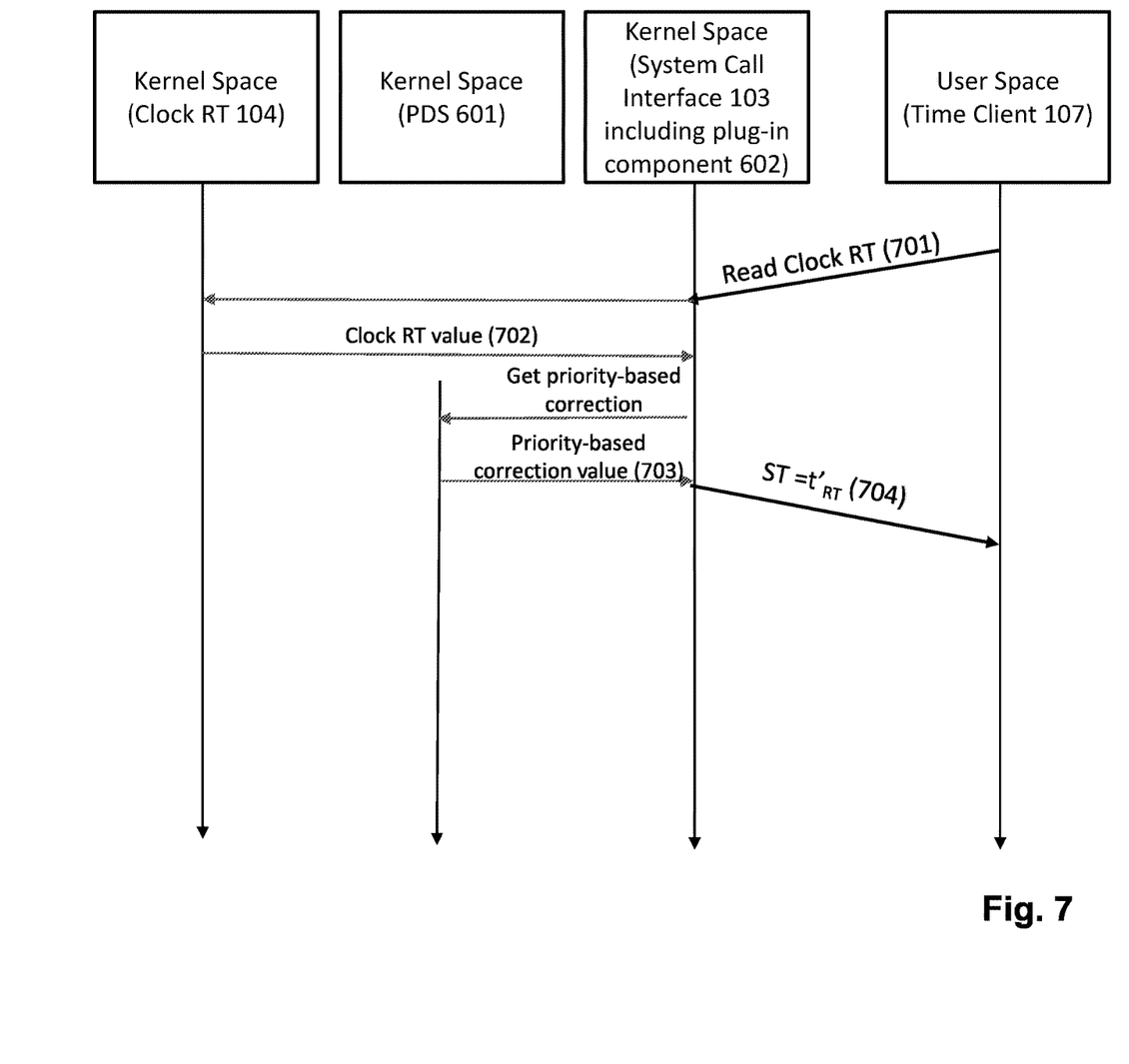
FIG. 7 illustrates a generalized pictorial representation of priority-based compensating the system time error $TE_{S2C}$ in accordance with certain embodiments of the presently disclosed subject matter.

FIG. 7 illustrates exemplified pictorial representation of priority-based compensating the errors in system time delivered to time clients in accordance with certain embodiments of the presently disclosed subject matter. Responsive to a "Read Clock RT" call received (701) from a TC with a certain priority, SCI obtains (702) Clock RT value from Clock RT 104 and obtains (703) priority-based correction value from PDS 601. Further, likewise detailed with reference to FIGS. 3 and 5, SCI sends (704) a system time corrected in accordance with TC's priority.

In certain embodiments, providing corrected system time can be further configurable. For example, the corrected system time can be provided only for certain time clients (e.g. in accordance with special policy marking recognizable by SCI 103).

It is noted that there can be different types of time clients: TCs of a first type require a timestamp (and accordingly, issue a "Read Clock RT" call) when some event has occurred. For such TCs, the system time shall be corrected by the entire roundtrip delay, namely the corrected value $(T_{rt})$ shall be calculated as system time value $(t_{rt})$ received by SCI reduced by the lastly calculated $TE_{S2C}$ multiplied by two: $T_{rt}=t_{rt}-2*TE_{S2C}$. TCs of another type require a timestamp to generate an event. For such TCs, the system time shall be corrected by one way roundtrip delay, namely the corrected value $(T_{rt})$ shall be calculated as system time value $(t_{rt})$ received by SCI reduced by the lastly calculated $TE_{S2C}$: $T_{rt}=t_{rt}-2*TE_{S2C}$.

By way of non-limiting example, the corrected system time can be provided only for one of the above types of TCs. Alternatively, differently corrected system time can be maintained in PDS 601, and plug-in component 602 can enable type-based system time correction in a manner similar to priority-based delivery of system time.

Figure 8:
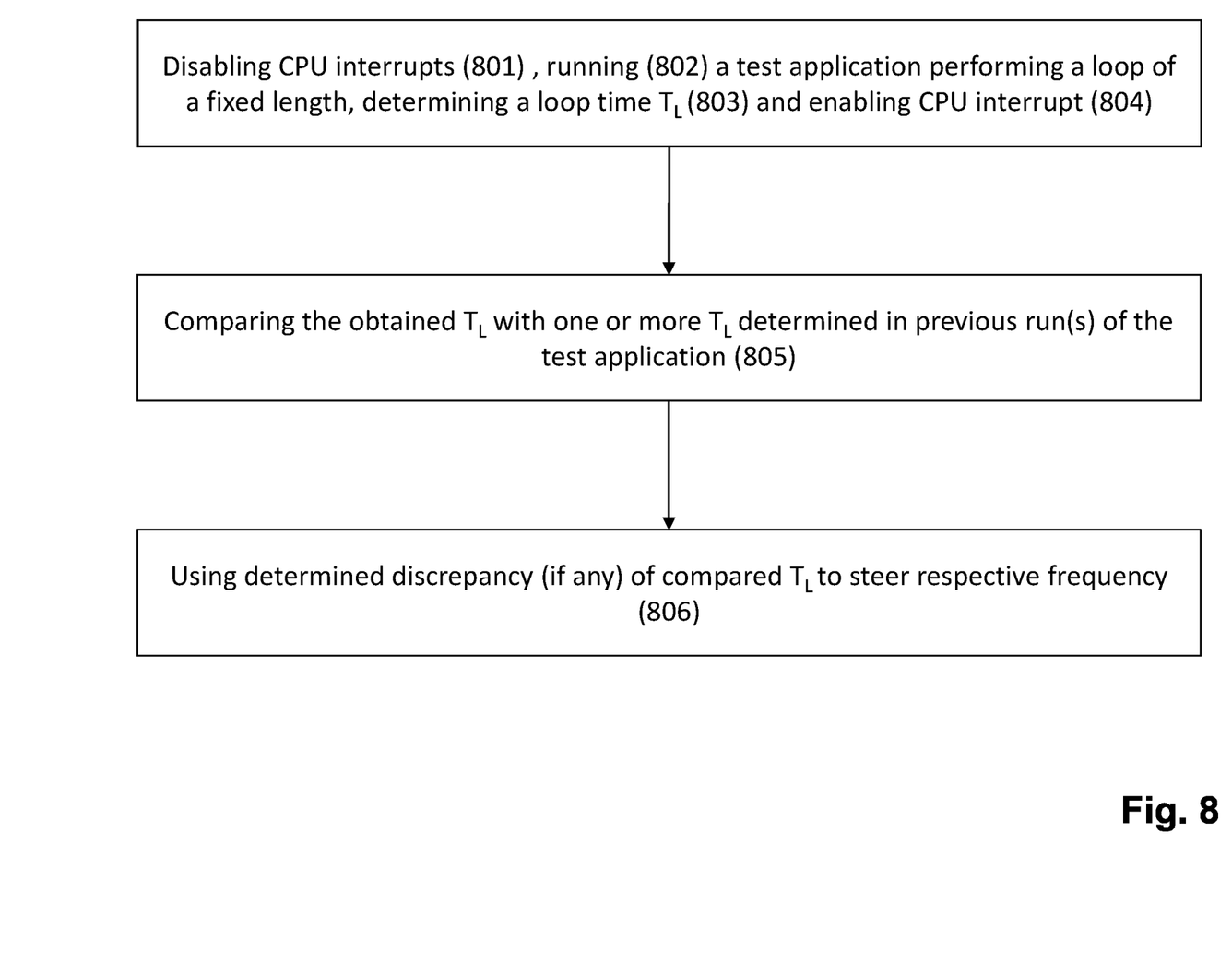
FIG. 8 illustrates a generalized flow chart of compensating $TE_{TP2S}$ time error in accordance with certain embodiments of the presently disclosed subject matter.

Alternatively or additionally, time agent component 105 can be usable for correcting the time error $TE_{TP2S}$. As detailed with reference to FIG. 1, Master Clock 106 can provide accurate time to Clock RT 104 with the help of time transfer protocol (e.g. PTP protocol). However, system time in embodiments with hardware-based timestamps can bear $TE_{TP2S}$ time errors. Such time errors can appear due to different frequency sources of the CPU and a Network Interface Card (NIC) when locked to PTP time. FIG. 8 illustrates a generalized flow chart of compensating the $TE_{TP2S}$ in accordance with certain embodiments of the presently disclosed subject matter.

The proposed method addresses two cases: (1) Stable frequency source of CPU and any frequency source in NIC; and (2) Stable frequency source of NIC and any frequency source of the computer processor.

Figure 9:
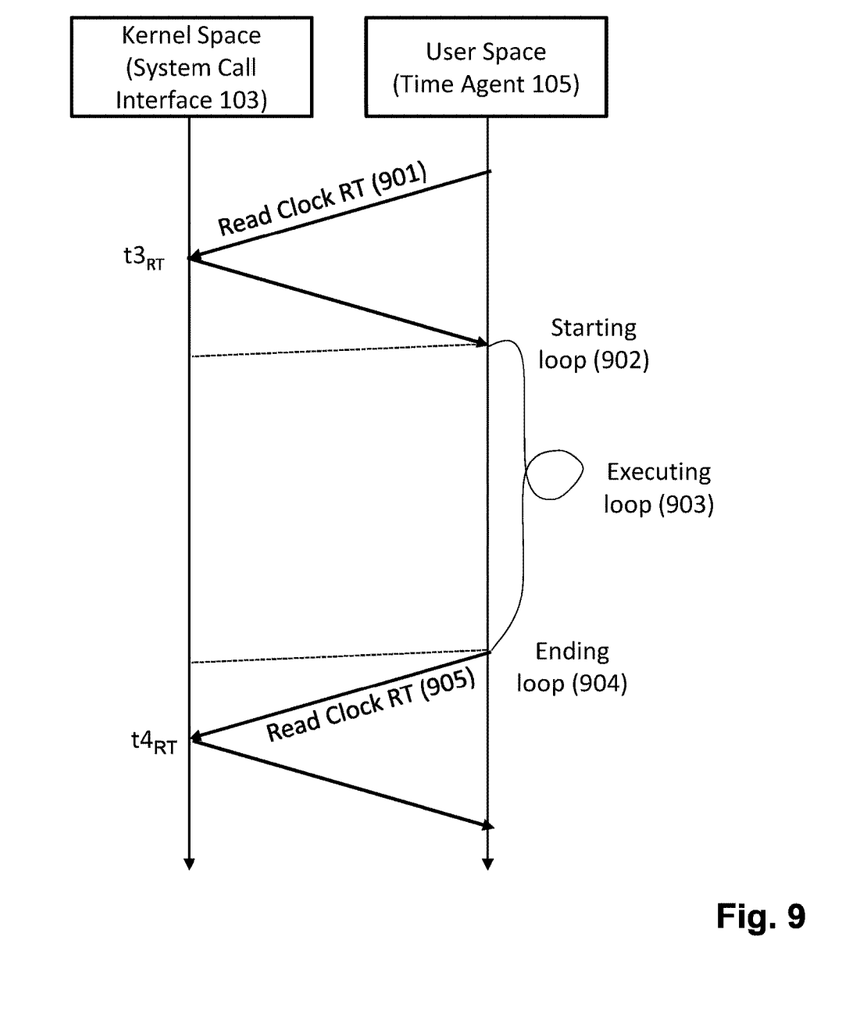
FIG. 9 illustrates a generalized pictorial representation measuring a duration of a test application in accordance with certain embodiments of the presently disclosed subject matter.

Time agent component 105 can be configured to disable (801) CPU interrupts and to run (802) a test application performing a test loop of a fixed length. Time agent component enables (804) CPU interrupts upon completing the test application. Thereby, time agent component 105 determines (803) a loop time $T_L$, i.e. time of execution the test loop. As illustrated in FIG. 9 for case (1), the test application can operate as a time client configured to: request (901) system time, start (902) the test loop responsive to receiving the system time, execute (903) the test loop and request system time (905) responsive to completion (904) of the test loop. Time agent component 105 registers system time t3 $_{RT}$ and t4 $_{RT}$ received by the test application at the beginning and the end of the executed loop. Time agent component further calculates the loop time as $T_L=t4_{RT}-t3_{RT}-2*TE_{S2C}$, wherein $TE_{S2C}$ is the last calculated time error of reading the system time by a time client.

In case (2), time agent component executes a similar procedure to define the loop time $T_L$. Test application in this case is configured to read the NIC time stamp, start the test loop responsive to obtaining a first timestamp value TS1, execute the test loop and, responsive to ending the test loop, read the NIC time stamp to obtain a second time stamp value TS2. Time agent component further calculates the loop time as $T_L$=TS2−TS1.

Referring back to FIG. 8, the time agent component compares (805) the determined $T_{L\text{-}current}$ with one or more $T_{L\text{-}previous}$ determined in previous run(s) of the test application and uses the determined discrepancy (if any) between the compared values of $T_L$ to steer (806) the respective frequency. For example in a case of a stable NIC clock, a positive determined discrepancy is indicative that CPU frequency source is slower than the NIC's one. Accordingly, the CPU clock shall be sped up by the value of the determined discrepancy (e.g. with the help of "void clock-adj_set_freq" Linux message).

Figure 10:
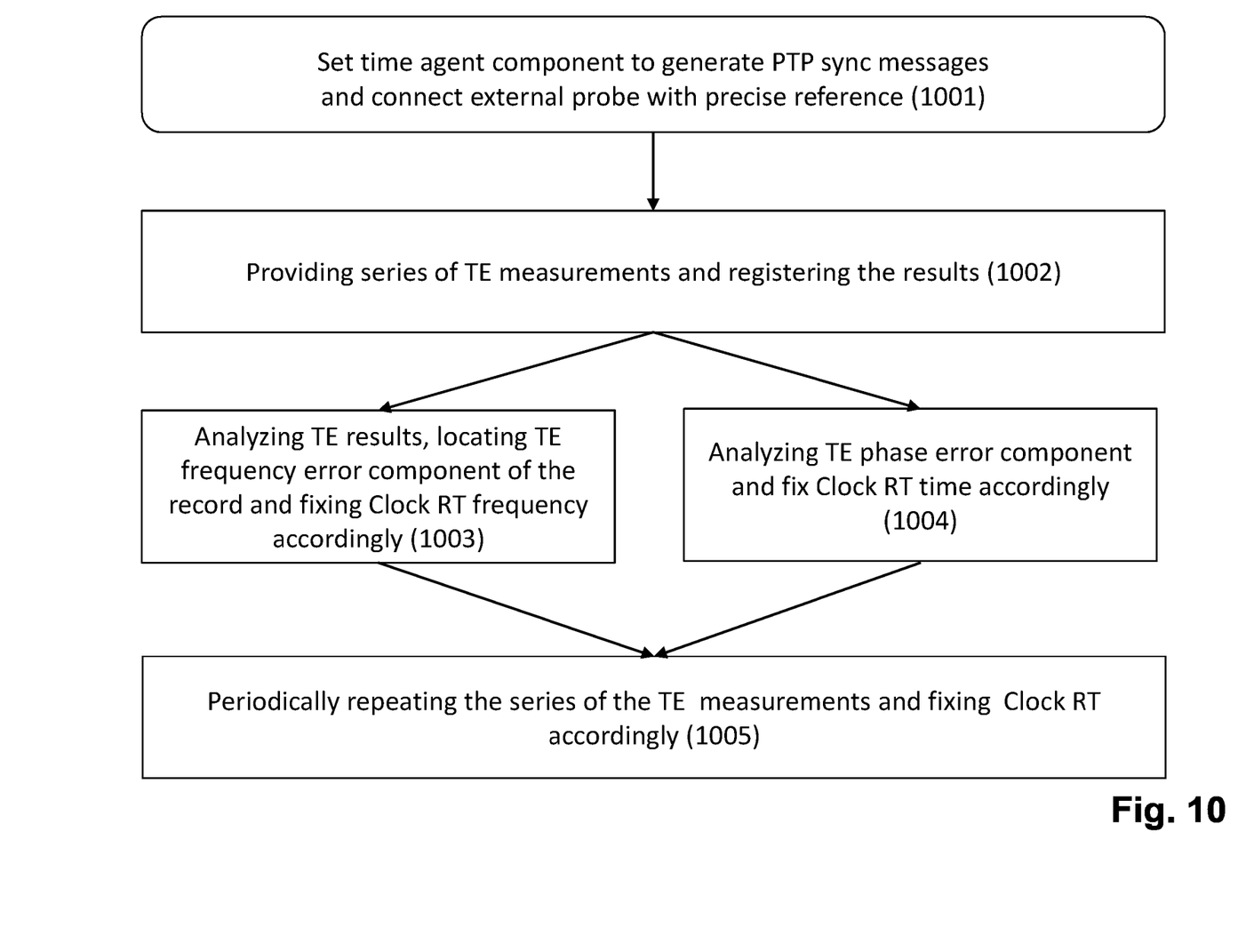
FIG. 10 illustrates a generalized flow chart of validating the provided time error compensation in accordance with certain embodiments of the presently disclosed subject matter.

FIG. 10 illustrates a generalized flow chart of validating the provided time error compensation. In accordance with certain embodiments of the presently disclosed subject matter, time agent component 105 can be operatively connected to an external probing device capable of precise references (e.g. provided by Global Navigation Satellite System (GNSS)). Time agent component 105 can be further configured (1001) to generate PTP sync messages, to exchange the PTP messages with the probing device, and to register respective PTP timestamps. Discrepancy between the respective PTP timestamps is indicative of a time error (TE). Time agent component 105 provides a series of TE measurements and registers (1002) the measurement results. The measurement results can be indicative of different types of time errors. Static time errors (not changing over time) can be indicative of phase error (i.e. of $TE_{S2C}$), while dynamic time errors can be indicative of frequency shift (i.e. of $TE_{TP2S}$). Time agent component 105 (and/or a management application operatively connected thereto) analyses the measurement results to locate the TE frequency error component and fix Clock RT frequency (1003) and/or to locate the TE phase error component and fix Clock RT time (1004) accordingly. For example, a TE frequency error component exceeding a predefined threshold can trigger frequency correction detailed above with reference to FIGS. 8-9 and a TE phase error component exceeding a predefined threshold can trigger system time correction detailed above with reference to FIGS. 3-7.

It is noted that, prior to analyzing the measurement results, time agent component 105 applies low pass filtering to filter out noise caused by variable delays of getting Clock RT and setting frequency.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the presently disclosed subject matter.

It will also be understood that the system according to the invention can be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of time delivery in a computing system comprising a memory storing a plurality of program components executable by the computing system, the memory comprising a kernel space and a user space, the kernel space comprising a system call interface (SCI) executable program component operatively connected to a time client executable program component and to a time agent executable program component located in the user space, the method comprising:
   a. executing a time agent component located in the user space to measure data indicative of delay in a system time delivery and to derive from the measured data a system time delivery error $TE_{S2C}$;
   b. using the system time delivery error $TE_{S2C}$ to enable correction of system time thereby giving rise to a corrected system time; and
   c. executing the time client component to send a Read Clock RT call and, in response to reception, executing the SCI component to send the corrected system time to the time client component.

2. The method of claim 1 further comprising periodically repeating the operations a)-c), and/or initiating the operations a)-c) responsive to one or more predefined events.

3. The method of claim 1, wherein enabling correction of system time comprises executing the time agent component to:
   calculate a corrected system time in accordance with the system time delivery error $TE_{S2C}$; and
   send the corrected system time to the SCI component as a value in a time setting command.

4. The method of claim 1, wherein measuring data indicative of delay in the system time delivery and deriving from the measured data the system time delivery error $TE_{S2C}$ comprises executing the time agent component to:
   d) issue N≥2 successive Read clock RT calls configured with the highest priority, wherein each next call is issued substantially immediately following a response received on a previous call;
   e) register system time $t1_{RT}$ received in response to the first call and time $t_{N\,RT}$ received in response to the last call;
   f) calculate $TE_{S2C}$ as $TE_{S2C}=(tN_{RT}-t1_{RT})/[(N-1)*2]$.

5. The method of claim 4, further comprising:
   executing the time agent component to measure data indicative of delays in the system time delivery for Read Clock RT calls with different priorities of a plurality of priorities, and to respectively obtain a set of data indicative of priority-based system time delivery errors $TE_{S2C}$ corresponding to respective priorities of the plurality of priorities; and
   in response to a system time request received from the time client component, recognizing priority of the timing client component and providing the time client component with system time corrected per system time delivery error corresponding to the recognized priority.

6. The method of claim 5, wherein obtaining the set of data indicative of priority-based system time delivery errors $TE_{S2C}$ comprises providing operations d)-f) separately for each priority of the plurality of priorities.

7. The method of claim 5, wherein the set of data indicative of priority-based system time delivery errors comprises at least one of:
    for each priority of the plurality of priorities, the last calculated $TE_{S2C}$;
    differences between the last calculated $TE_{S2C}$ for the highest priority and the last calculated $TE_{S2C}$ for each of the lower priorities;
    for each priority of the plurality of priorities, differences between the last calculated $TE_{S2C}$ and the previously calculated $TE_{S2C}$; and
    for each priority of the plurality of priorities, system time $t_{rt}$ lastly corrected in accordance with $TE_{S2C}$ corresponding to respective priority.

8. The method of claim 5, wherein the set of data indicative of priority-based system time delivery errors is maintained by the time agent component in a data structure located in the kernel space and accessible to the SCI component.

9. The method of claim 8, wherein the SCI component, in response to the system time request, obtains from the data structure the data indicative of system delivery error corresponding to the recognized priority, and uses the obtained data to calculate the corrected system time.

10. The method of claim 1 further comprising:
    g) upon disabling CPU interrupts, running a test application performing a loop of a fixed length and determining a value of loop time $T_L$;
    h) comparing the determined value of loop time with one or more values of loop time determined in one or more previous runs of the test application thereby determining a discrepancy between the values; and
    i) using the determined discrepancy between the values to steer relative frequencies of time sources in a central processing unit and a network interface card comprised in the computing system.

11. The method of claim 10, wherein operations a)-c) and/or g)-i) are provided responsive to results of validation, the validation comprising:
    exchanging, by the time agent component, PTP (Precision Time Protocol) sync messages with an external probe device with a reference provided by a Global Navigation Satellite System; and
    registering respective PTP timestamps thereby obtaining measurement results indicative of time errors, wherein static time errors are indicative of system time delivery errors and dynamic time errors are indicative of discrepancy of frequency shift.

12. A computing system comprising a memory storing a plurality of program components executable by the computing system, the memory comprising a kernel space and a user space, the kernel space comprising a system call interface (SCI) executable program component operatively connected to a time client executable program component and a time agent executable program component comprised in the user space, the computing system configured to:
    a) execute the time agent component to measure data indicative of delay in a system time delivery and to derive from the measured data a system time delivery error $TE_{S2C}$;
    b. execute the time agent component to use the system time delivery error $TE_{S2C}$ to enable correction of system time thereby giving rise to a corrected system time; and
    c. execute the time client component to send a Read Clock RT call and, in response to reception, execute the SCI component to send the corrected system time to the time client component.

13. The system of claim 12, wherein enabling correction of system time comprises executing the time agent component to:
    calculate a corrected system time in accordance with the system time delivery error $TE_{S2C}$; and
    send the corrected system time to the SCI component as a value in a time setting command.

14. The system of claim 12, wherein measuring data indicative of delay in the system time delivery and deriving from the measured data the system time delivery error $TE_{S2C}$ comprises executing the time agent component to:
    d) issue N≥2 successive Read clock RT calls configured with the highest priority, wherein each next call is issued substantially immediately following a response received on a previous call;
    e) register system time $t1_{RT}$ received in response to the first call and time $t_{N\,RT}$ received in response to the last call;
    f) calculate $TE_{S2C}$ as $TE_{S2C}=(tN_{RT}-t1_{RT})/[(N-1)*2]$.

15. The system of claim 14, further configured to:
    execute the time agent component to measure data indicative of delays in the system time delivery for Read Clock RT calls with different priorities of a plurality of priorities, and to respectively obtain a set of data indicative of priority-based system time delivery errors $TE_{S2C}$ corresponding to respective priorities of the plurality of priorities; and
    in response to a system time request received by executing the time client component, execute the SCI component to recognize priority of the timing client component and to provide the time client component with system time corrected per system time delivery error corresponding to the recognized priority.

16. The system of claim 15, wherein obtaining the set of data indicative of priority-based system time delivery errors $TE_{S2C}$ comprises providing operations d)-f) separately for each priority of the plurality of priorities.

17. The system of claim 15, wherein the set of data indicative of priority-based system time delivery errors comprises at least one of:
    for each priority of the plurality of priorities, the last calculated $TE_{S2C}$;
    differences between the last calculated $TE_{S2C}$ for the highest priority and the last calculated $TE_{S2C}$ for each of the lower priorities;
    for each priority of the plurality of priorities, differences between the last calculated $TE_{S2C}$ and the previously calculated $TE_{S2C}$; and
    for each priority of the plurality of priorities, system time $t_{rt}$ lastly corrected in accordance with $TE_{S2C}$ corresponding to respective priority.

18. The system of claim 15, wherein the set of data indicative of priority-based system time delivery errors is configured to be maintained by the time agent component in a data structure located in the kernel space and accessible to the SCI component.

19. The system of claim 18, wherein SCI component is configured, in response to the system time request, to obtain from the data structure the data indicative of system delivery error corresponding to the recognized priority, and to use the obtained data to calculate the corrected system time.

20. A non-transitory computer-readable medium comprising instructions that, when executed by a computing system comprising a memory storing a plurality of program components executable by the computing system, the memory comprising a kernel space and a user space, the kernel space comprising a system call interface (SCI) executable program component operatively connected to a time client executable program component and a time agent executable program component comprised in the user space, cause the computing system to:
- execute the time agent component to measure data indicative of delay in a system time delivery and to derive from the measured data a system time delivery error $TE_{S2C}$;
- execute the time agent component to use the system time delivery error TES2C to enable correction of system time thereby giving rise to a corrected system time; and
- execute the time client component to send a Read Clock RT call and, in response to reception, execute the SCI component to send the corrected system time to the time client component.

\* \* \* \* \*